(12) United States Patent
Congratel et al.

(10) Patent No.: US 10,107,116 B2
(45) Date of Patent: Oct. 23, 2018

(54) FLOW DISTRIBUTION BLADING COMPRISING AN IMPROVED SEALING PLATE

(71) Applicant: SNECMA, Paris (FR)

(72) Inventors: Sebastien Congratel, Moissy-Cramayel (FR); Marion Chambre, Moissy-Cramayel (FR); Thomas Marchyllie, Moissy-Cramayel (FR); Bruno Richard, Moissy-Cramayel (FR); Romain Roullet, Moissy-Cramayel (FR); Denis Aydin, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 251 days.

(21) Appl. No.: 14/765,816

(22) PCT Filed: Jan. 30, 2014

(86) PCT No.: PCT/FR2014/000019
§ 371 (c)(1),
(2) Date: Aug. 4, 2015

(87) PCT Pub. No.: WO2014/122371
PCT Pub. Date: Aug. 14, 2014

(65) Prior Publication Data
US 2015/0354381 A1    Dec. 10, 2015

(30) Foreign Application Priority Data

Feb. 5, 2013  (FR) ...................................... 13 50978
Feb. 5, 2013  (FR) ...................................... 13 50979

(51) Int. Cl.
*F01D 9/04*        (2006.01)
*F01D 11/00*      (2006.01)
(Continued)

(52) U.S. Cl.
CPC ............ *F01D 9/041* (2013.01); *F01D 11/001* (2013.01); *F01D 21/045* (2013.01);
(Continued)

(58) Field of Classification Search
CPC .. F01D 9/041; F05D 2220/30; F05D 2230/10; F05D 2230/11
See application file for complete search history.

(56) References Cited

U.S. PATENT DOCUMENTS 4,184,689 A * 1/1980 Brodell ................. F01D 11/005
                                                              277/637
4,537,024 A * 8/1985 Grosjean ............... F01D 11/005
                                                              415/139
(Continued)

FOREIGN PATENT DOCUMENTS

FR       2444802          7/1980
FR       2961849 A1 * 12/2011 ............ F01D 11/005
(Continued)

OTHER PUBLICATIONS

FR 2961849 A1 English.*
(Continued)

*Primary Examiner* — Mark Laurenzi
*Assistant Examiner* — Shafiq Mian
(74) *Attorney, Agent, or Firm* — Womble Bond Dickinson (US) LLP

(57) ABSTRACT

The invention concerns a fixed flow distribution blading (10) in a turbomachine, comprising two coaxial annular platforms that are internal (12) and external respectively, linked to each other by a plurality of radial blades (11), in which the internal annular platform (12) comprises an annular radial partition (120) and a blade support ring (121) extending to each side of an outer radial end of said partition (120), the blading (10) further comprising an annular sealing plate (20)

(Continued)

mounted on the internal annular platform (12), on the upstream side of the radial partition relative to an airflow in the blading, the blading (10) being characterized in that the sealing plate (20) is mounted on the blade support ring (121), and in that it comprises a circumferential groove. The invention also concerns a method for producing such a blading and a turbomachine comprising such a blading.

14 Claims, 11 Drawing Sheets

(51) Int. Cl.
*F01D 21/04* (2006.01)
*F01D 25/24* (2006.01)

(52) U.S. Cl.
CPC ........ *F01D 25/246* (2013.01); *F05D 2220/30* (2013.01); *F05D 2230/10* (2013.01); *F05D 2230/31* (2013.01); *F05D 2230/64* (2013.01); *F05D 2240/11* (2013.01); *F05D 2240/57* (2013.01); *Y02T 50/671* (2013.01); *Y02T 50/673* (2013.01); *Y10T 29/49325* (2015.01)

(56) References Cited

U.S. PATENT DOCUMENTS

| | | | | |
|---|---|---|---|---|
| 4,749,333 A | * | 6/1988 | Bonner | F01D 11/005 277/591 |
| 6,139,264 A | * | 10/2000 | Schilling | F01D 11/001 415/174.2 |
| 7,291,946 B2 | * | 11/2007 | Clouse | F01D 5/26 310/51 |
| 7,918,643 B2 | * | 4/2011 | Weaver | F01D 11/001 277/347 |
| 8,105,019 B2 | * | 1/2012 | McCaffrey | F02C 9/22 415/160 |
| 9,181,810 B2 | * | 11/2015 | Dimmick, III | F01D 5/3015 |
| 2006/0083607 A1 | * | 4/2006 | Synnott | F01D 11/08 415/173.1 |
| 2010/0187762 A1 | * | 7/2010 | Heinz-Schwarzmaier | F01D 11/005 277/312 |
| 2010/0232938 A1 | * | 9/2010 | Harris, Jr. | F01D 5/26 415/173.1 |
| 2012/0043724 A1 | | 2/2012 | Scimeca et al. | |

FOREIGN PATENT DOCUMENTS

| | | |
|---|---|---|
| WO | WO-2011035798 | 3/2011 |
| WO | WO-2012150424 | 11/2012 |

OTHER PUBLICATIONS

International Search Report and Written Opinion with English Language translation, dated May 8, 2014, Application No. PCT/FR2014/000019.

* cited by examiner

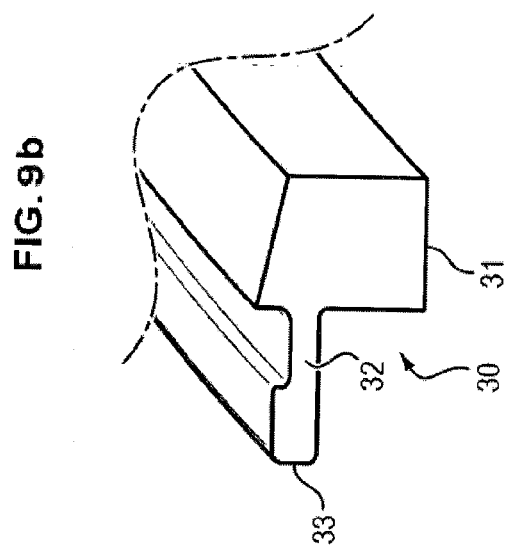
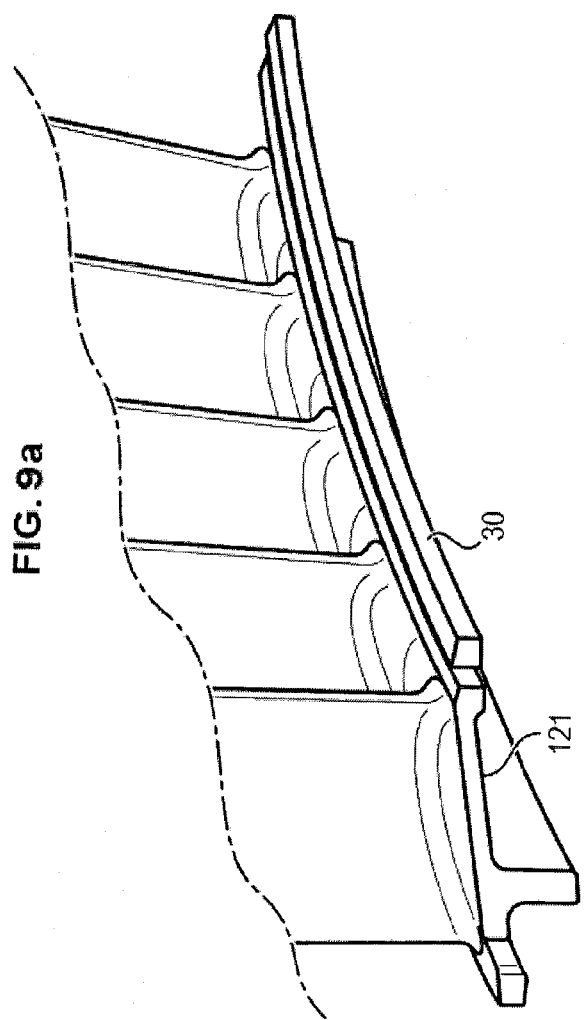

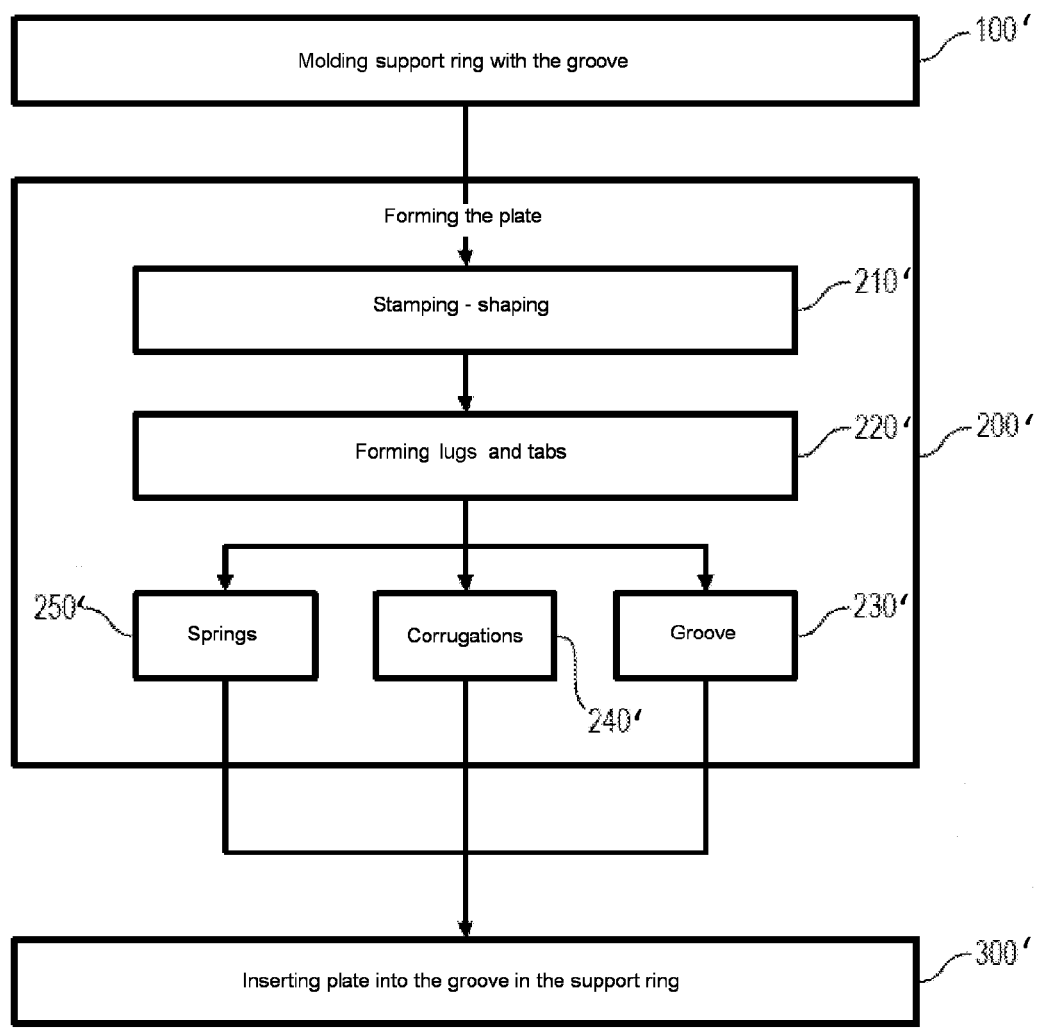

FLOW DISTRIBUTION BLADING COMPRISING AN IMPROVED SEALING PLATE

FIELD OF THE INVENTION

The field of the invention is that of fixed vane assemblies for distributing flow within a turbomachine.

PRIOR ART

A turbomachine includes turbine stages each including a bladed rotor disc and a vane assembly for distributing the airflow (stator) flowing within the turbine, each vane assembly including two coaxial annular platforms, one extending inside the other, and between which extend a plurality of fixed radial blades.

The flow of air in the turbomachine extends normally within the blade passage, that is between the fixed blades. In order to avoid recirculation of air in a radial direction between the rotor passage and the interstice between the platform of the fixed vane assembly and the rotor located upstream of it with respect to the airflow, fixed vane assembly stages forming the stator and the rotor have been provided with elements cooperating for forming a labyrinth type seal.

Each rotor stage includes in this regard an annular downstream spoiler, while each fixed vane assembly has, on its inner platform, a sealing plate extending upstream so that the two (annular spoiler and sealing plate) are partially superimposed.

The sealing plate must also accomplish a so-called "fuse" function to preserve a breakage hierarchy in the event of an overspeed of the turbine, that is to say a considerable increase in the rotation speed of the turbine which can lead for example to a fracture of the turbine shaft.

To stop this malfunction, which can have serious consequences for the integrity of the turbine and therefore of the aircraft, it is desired to break a maximum of rotor blades on the fixed blades of the stator (set of fixed vane assembly stages) based on the principle that the rotor moves back with respect to the stator under the influence of aerodynamic forces, bringing about contact between the fixed blades of the stator and the moving blades of the rotor.

A distinction is made between damaging overspeed clearances, located between the trailing edge of the moving blades of the rotor and the leading edge of the fixed blades of the stator at the upper level or in the middle of the passage, and non-damaging overspeed clearances, located between the trailing edge of the moving blades of the rotor and the leading edge of the fixed blades of the lower level of the passage.

To better control overspeed and thus preserve the breakage hierarchy so as to guarantee stopping of the turbine, it is necessary that the damaging overspeed clearances be filled first, that is that they become zero before the non-damaging overspeed clearances. This factual situation requires that the non-damaging overspeed clearances be increased to ensure that hierarchy.

A contradiction therefore results regarding the sealing plate: an increase in non-damaging overspeed clearances in the lower passage implies a reduction in the overlapping clearance, and vice versa.

However, given the slight clearance between this plate and the upstream rotor, the rotor/stator contact will occur first in this area in the event of a turbine overspeed. To preserve the breakage hierarchy in the event of an overspeed, the sealing plate must not oppose any resistance and must break or must buckle faster in the event of collision with the movable rotor, hence this "fuse" function.

In this regard, a section view is shown in FIG. 1 of a lower platform 12 of fixed vane assembly 10 for distributing flow, illustrating the configuration of a sealing plate adopted up to the present time. The lower platform includes a wall 120 extending radially and a support ring 121 of a vane assembly, extending substantially axially on either side of the wall.

The sealing plate 2 is fastened by brazing only to the wall of the lower platform, on the upstream side, so as to be easily destroyed in the event of collision with the rotor. In addition, it has corrugations between the portion brazed to the wall and the part extending upstream, to make it less rigid.

The sealing plate therefore requires, during its manufacture, a considerable number of operations: first, cutting and shaping, which is complex due to the corrugations that the plate has, and brazing the plate to the platform's wall.

This manufacturing method is complex, requires excess charges for machining to prepare the surfaces to be brazed, as well as a prolongation of the manufacturing time.

There also exists a need for an alternative for manufacturing the sealing plate, retaining the same sealing and "fuse" functions, and facilitating the manufacturing method.

PRESENTATION OF THE INVENTION

The invention has as its goal to resolve the problems mentioned before, by proposing a vane assembly for distributing flow including a sealing plate with simplified manufacture.

In this regard, the invention has as its object fixed vane assembly for distributing flow within a turbomachine, including two coaxial annular platforms, respectively inner and outer, interconnected by a plurality of radial blades, wherein the annular inner platform includes a radial annular wall and a support ring of the blades extending on either side of a radially inner end of said wall, the vane assembly further including an annular sealing plate fastened to the inner annular platform, on the upstream side of the radial wall with respect to an air flow within the vane assembly, the vane assembly being characterized in that the sealing plate is fastened to the support ring of the blades, and in that it comprises a circumferential groove.

Advantageously but optionally, the fixed vane assembly for distributing flow according to the invention can further include at least one of the following characteristics:
- the sealing plate is made of sheet metal.
- the sealing plate is fastened to a radially inner surface of the support ring of the blades.
- the support ring of the blades includes, on a radially inner surface, an annular groove, and the sealing plate is an elastic split ring including a circumferential protrusion complementary to the groove.
- the support ring of the blades includes an upstream face, and the sealing plate is fastened to the upstream face of the support ring.
- the upstream face of the support ring of the blades comprises an annular groove, and the sealing plate is inserted into said groove in a strip with a width corresponding to the depth of the groove, the sealing plate comprising on said width a plurality of lugs arranged regularly along the circumference of the sealing plate to maintain the plate in position in the groove.

Another object of the invention is a method for manufacturing such a vane assembly, including the steps consisting of:

making an annular groove in an annular sealing plate by stamping or machining, and applying the annular sealing plate onto a support ring of the blades of a radially inner platform of a fixed vane assembly for distributing flow.

Advantageously, but optionally, the manufacturing method also includes at least one of the following features:

the method includes, before applying the sealing plate onto the support ring, the steps consisting of:

forming an annular groove in an upstream face of the support ring, and forming a plurality of lugs on the annular sealing plate by laser cutting and folding, the step consisting of applying the annular sealing plate to the support ring comprising the insertion of the annular sealing plate into the groove of the support ring.

the annular groove in the support ring is made during a step consisting of casting said blade support ring, by inserting a foundry core (30) into a mold used for making said ring.

The invention also has as its object a fixed blade assembly for distributing flow within a turbomachine, including two annular coaxial platforms respectively inner and outer, interconnected by a plurality of radial blades, wherein the annular blade support platform includes a radial annular wall and a support ring of the blades extending to either side of a radially outer end of said wall, the vane assembly further including an annular sealed plate fastened to the inner annular platform, on the upstream side of the radial wall with respect to an air flow in the vane assembly, the vane assembly being characterized in that the support ring of the blades includes an annular groove, and the sealing plate is inserted into said groove in a strip with a width corresponding to the depth of the groove, the sealing plate comprising, over said width, a plurality of lugs designed to maintain the plate in axial position in the groove with respect to the axis of the platform, and in that the sealing plate comprises:

on its width designed to be inserted into the groove, a plurality of portions corrugated in the direction of the axis of the axial platform, said portions being spaced by rectilinear portions in said direction, or on its end designed to be inserted into the groove, a plurality of protruding tabs, each tab being surrounded by a shape-memory spring.

This vane assembly can be made by a manufacturing method including steps consisting of:

making a groove in a support ring of the vane assembly, making a plurality of lugs on an annular sealing plate by cutting and folding, and inserting a sealing plate into the groove in the support ring of the blades so that the lugs are inserted into the groove.

The invention further has as its object a turbomachine including at least one fixed vane assembly for distributing flow according to the preceding descriptions.

The fact of applying the sealing plate to the support ring of the blades makes it possible to shorten it and to lighten it, which reduces its production cost and also makes it possible to avoid a step consisting of corrugating the plate to reduce its stiffness.

DESCRIPTION OF THE FIGURES

Other features, aims and advantages of the invention will be revealed by the description hereafter, which is purely illustrative and not restrictive, which must be read with regard to the appended drawings whereon:

FIG. 3b shows a detail of an embodiment of a vane assembly of FIG. 3a,

FIG. 4e shows an axial section view of the installation of a sealing plate in vane assembly of FIG. 4a.

FIG. 9a shows a support ring of the blades in which a groove is made by means of a foundry core, FIG. 9b shows a foundry core of FIG. 5a.

FIG. 10 shows the principal steps of the manufacturing method for vane assembly according to the embodiments shown in FIGS. 4a to 7b.

DETAILED DESCRIPTION OF AT LEAST ONE EMBODIMENT OF THE INVENTION

Figure 1:
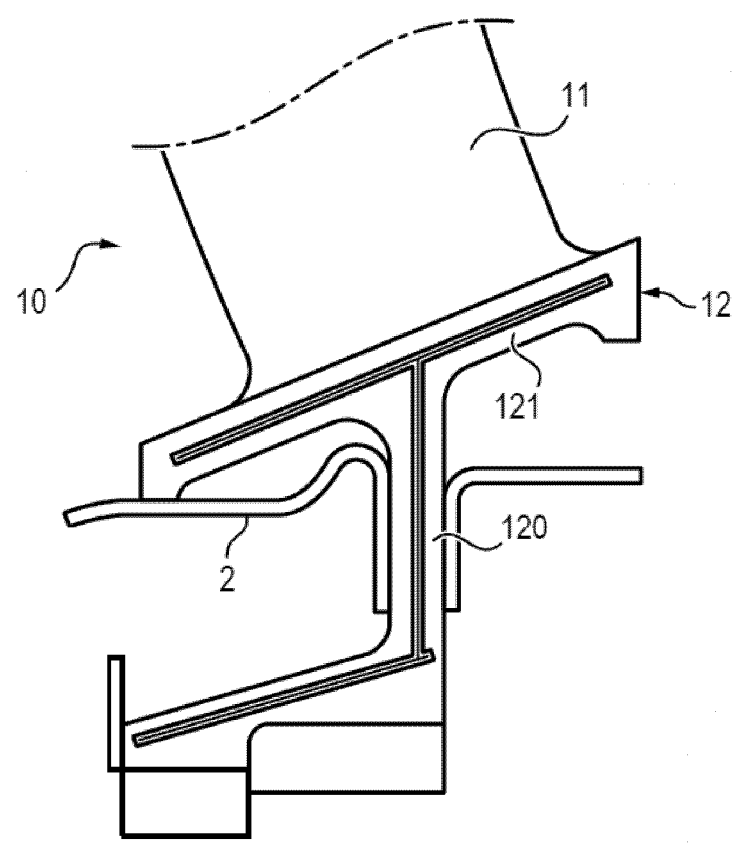
FIG. 1, already described, shows an axial section view of a lower platform of a vane assembly of the prior art.
Figure 2A:
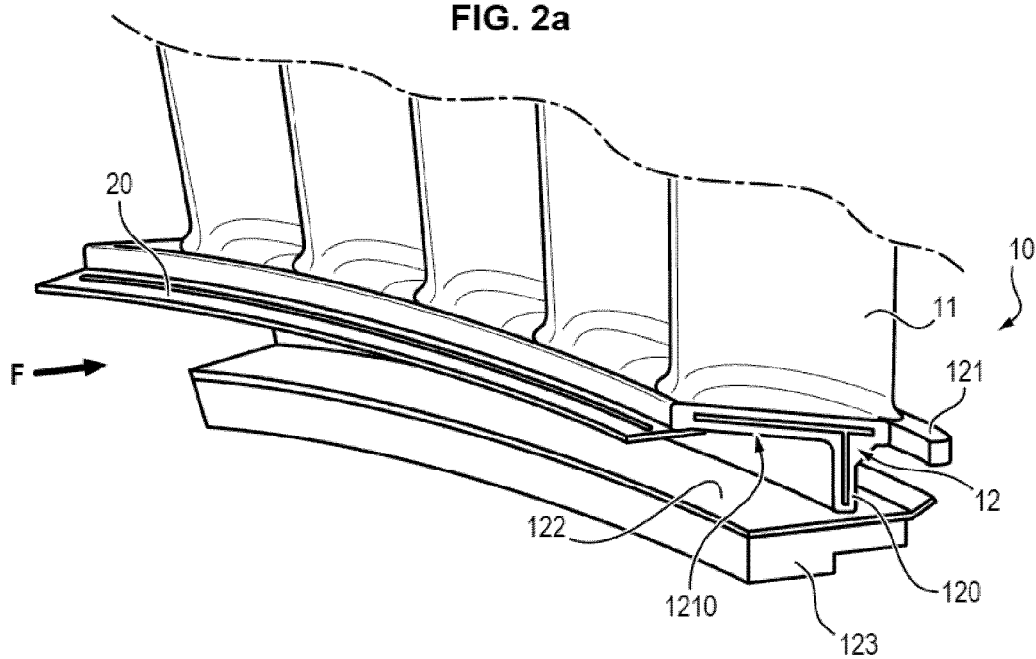
FIG. 2a shows a partial perspective view of a vane assembly conforming to an embodiment of the invention.

Referring to FIG. 2a, a partial view of fixed vane assembly 10 for distributing the airflow flowing in a turbomachine is shown, forming one stage of a nozzle of a turbomachine's turbine, for example of the low pressure turbine. This fixed vane assembly stage is therefore configured to be positioned downstream of a moving vane assembly stage of the rotor.

The vane assembly 10 comprises a plurality of fixed blades 11 positioned radially with respect to an axis of the turbomachine (not shown), which also is the axis of the vane assembly, said blades each extending between an inner annular platform 12 and an outer annular platform 13 (shown in FIG. 3a), coaxial about the axis of the vane assembly.

The platform 12 comprises an annular wall 120 extending radially with respect to the axis of the turbomachine, as well as a support ring 121 of the blades 11 extending on either side of the wall at a radially outer end thereof.

The platform 12 also comprises a ring 122 supporting a layer of abradable material 123 extending on either side of the radial wall 120, at its radially inner end.

Figure 3A:
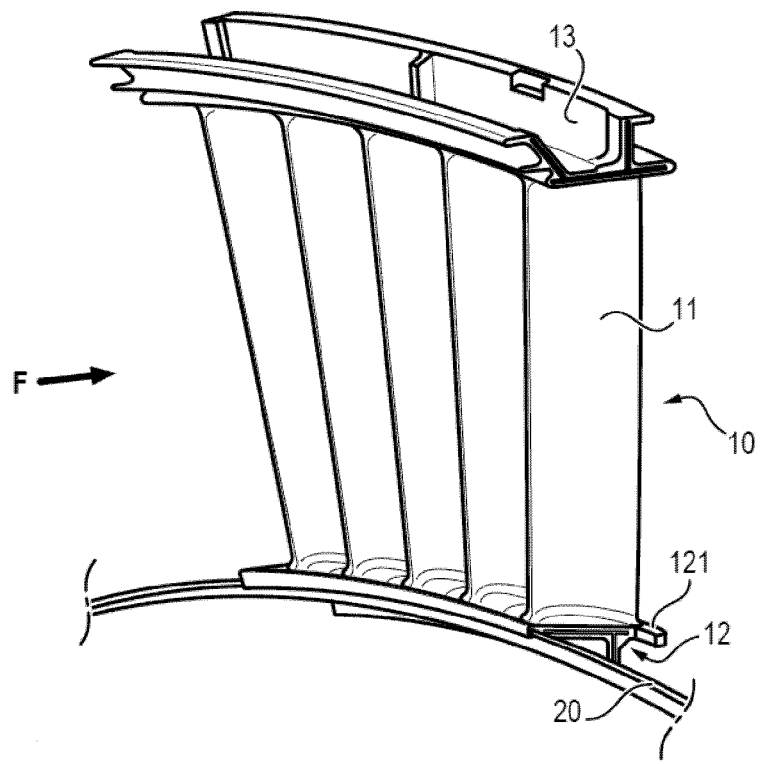
FIG. 3a shows a partial perspective view of a vane assembly conforming to another embodiment of the invention.
Figure 4A:
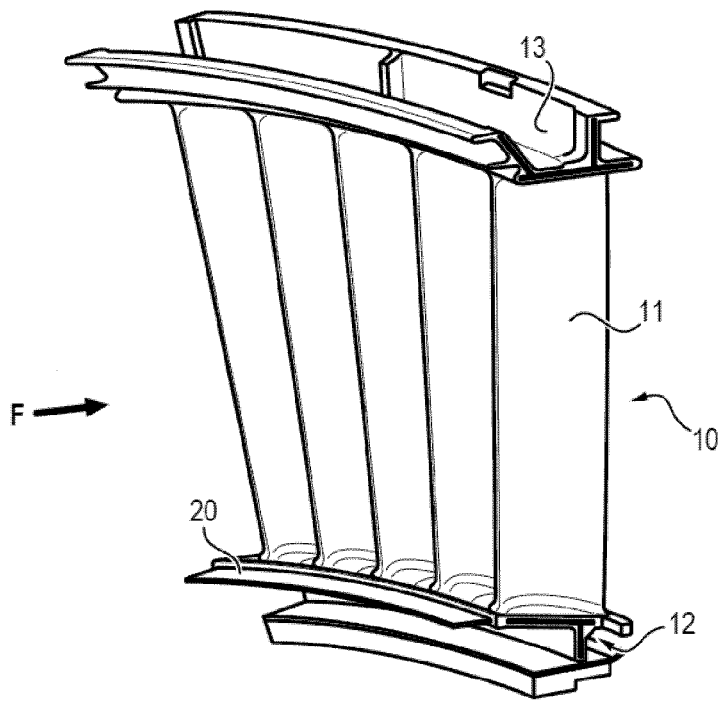
FIG. 4a shows a partial perspective view of a vane assembly conforming to another embodiment of the invention.
Figure 4B:
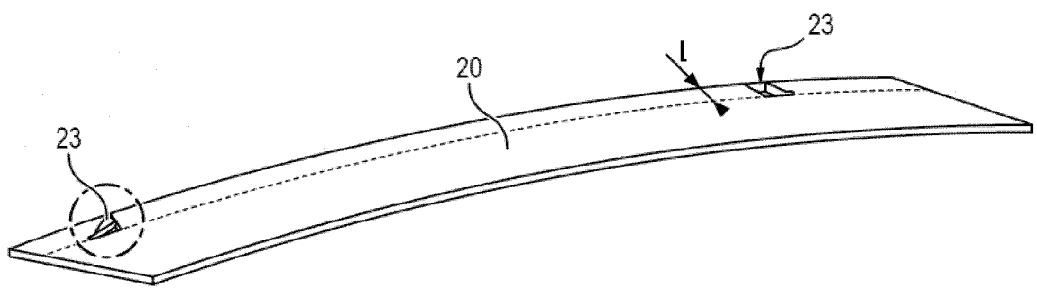
FIG. 4b shows a partial perspective view of a sealing plate of a vane assembly of FIG. 4a, FIGS. 4c and 4d show a detail of embodiment of a plate of FIG. 4b, respectively in perspective and seen from below.
Figure 4C:
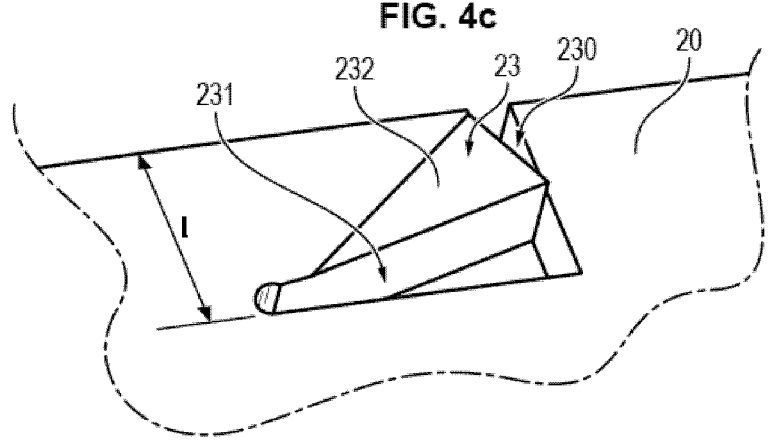
Figure 4D:
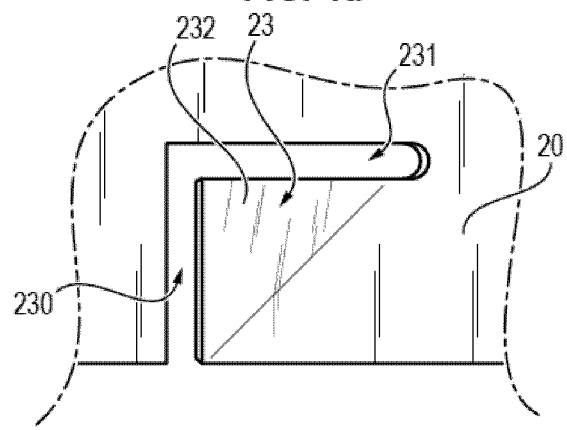
Figure 4E:
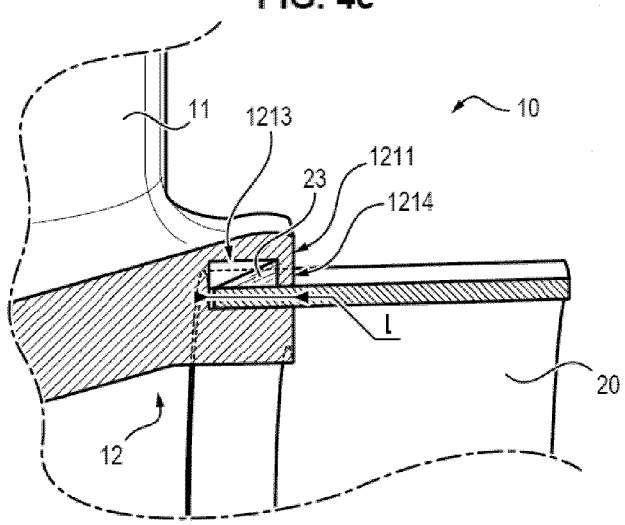

In FIGS. 2a, 3a, and 4a, an arrow F shows the direction of flow of the air through the vane assembly 10, thus defining an upstream portion with respect to the airflow by which the airflow arrives, and a downstream portion with respect to the airflow, by which the airflow leaves.

The rings 121 and 122, as well as the radial wall 120, delimit a cavity opening upstream and a cavity opening downstream with respect to the airflow.

In addition, the vane assembly 10 includes an annular sealing plate 20, fastened to the inner annular platform 12 and on the upstream side of the radial wall with respect to the airflow, and extending upstream.

This annular sealing plate is configured to cooperate with a downstream spoiler of rotor vane assembly located upstream of the vane assembly in the turbine, to form a seal of the labyrinth type as described previously.

The annular sealing plate 20 is fastened to the support ring 121 of the blades, and not to the radial wall 120. The sealing plate 20 is thus shorter in the axial direction, hence lighter, and simple to manufacture.

The sealing plate 20 is advantageously made of sheet metal.

According to one embodiment shown in FIG. 2a, the sealing plate 20 is fastened to the support ring 121 of the blades, at a radially inner surface 1210 of the ring, by brazing.

Figure 2B:
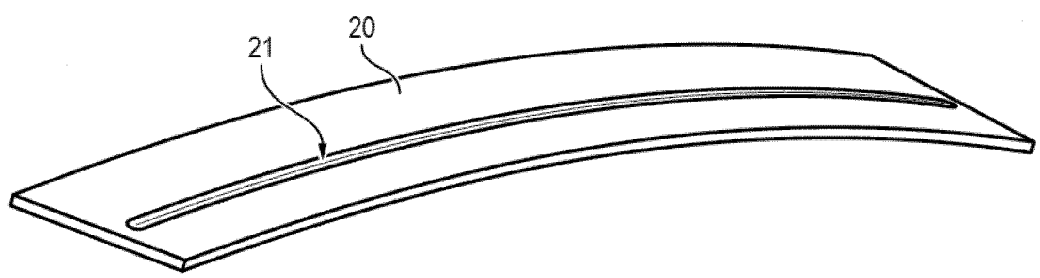
FIG. 2b shows a partial perspective view of a sealing plate of a vane assembly conforming to FIG. 2a, FIG. 2c shows an axial section view of a plate of FIG. 2b.
Figure 2C:
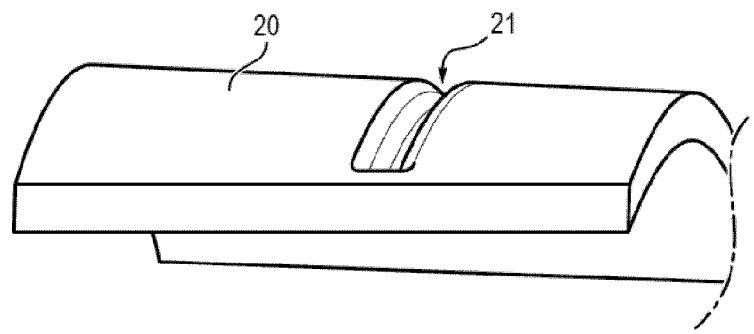

Advantageously, referring to FIGS. 2b and 2c, the plate 20 also comprises a circumferential groove 21 reducing its stiffness, so that the plate can also provide its so-called "fuse" function.

Alternatively, the plate 20 can include a plurality of circumferential grooves shaped as sectors of a circle, or even a plurality of axial grooves.

Figure 3B:
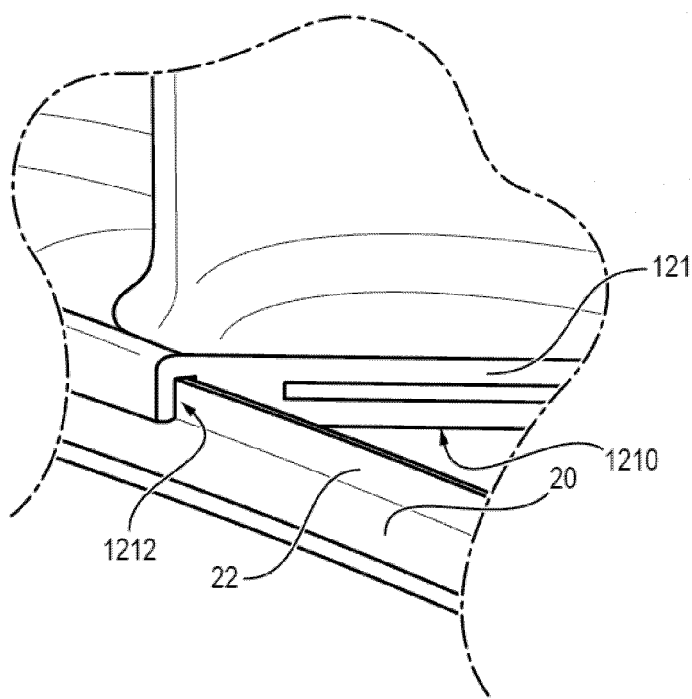

According to an alternative mode of manufacture shown in FIGS. 3a and 3b, the sealing plate 20 is a "C-clip," that is a split elastic ring, comprising on its periphery a circumferential protrusion 22. The support ring 121 of the vane assembly 10 then has an annular groove 1212 on its radially inner surface 1210, designed to receive the protrusion 22 of the plate 20.

The sealing plate 20 being in the form of a split elastic ring, it can be slightly deformed to reduce its diameter, so as to allow the insertion of the protrusion into the groove in the support ring 121 of the blades. Once in place, the split ring returns to its initial diameter due to its elasticity, thus ensuring that it is held in position.

This embodiment has the advantage that the placement of the plate 20 does not require a brazing step, which is often time-consuming because it requires preparing the surfaces to be brazed before the brazing step itself. Also, thanks to the absence of brazing, a vane assembly according to this embodiment can be prepared more easily.

Finally, to provide the fuse operation described earlier, the plate 20 can further include a circumferential groove (not shown), or the alternatives described earlier in relation to the embodiment of FIGS. 2b and 2c.

According to an alternative embodiment shown in FIGS. 4a to 4e, the support ring 121 of the blades includes, on its upstream face 1211 a circumferential groove 1213, designed to receive the sealing plate 20.

The groove 1213 has a depth I, corresponding to the width of an annular strip of the sealing plate 20 which is inserted there.

To hold it in place in the groove 1213, the sealing plate 20 includes a plurality of lugs 23, preferably but not restrictively distributed regularly, that is with a constant angular interval with respect to the axis of the vane assembly, over the circumference of the plate 20. The lugs are made in an annular end strip with a width I of the plate designed to be inserted into the groove.

The lugs 23 consist of L-shaped cuts made from the edge of the plate to be inserted into the groove 1213, that is a first portion 230 of the cutout substantially orthogonal to the edge of the plate and a second portion 231 of the cutout orthogonal to the first, and thus substantially parallel to the edge of the plate. The sheet metal portion 232 of the plate 20 delimited by this cut is then folded to form a protrusion from the surface of the plate 20.

The orthogonal cutout 230 at the edge of the plate can have a length less than or equal to the depth I of the groove. For example, in FIG. 4e, this cutout 230 has a length equal to the depth of the groove. In other embodiments described hereafter, it is smaller. The lugs 23 can be folded alternately to one side of the plate and the other.

Advantageously, the second portion of the cut, parallel to the edge of the plate, extends successively from one lug to another, from one side and the other of the first part of the cutout, so as to cause the orientation of the lugs to vary and to make more difficult the withdrawal of the lugs after positioning of the sealing plate 20.

Figure 6A:
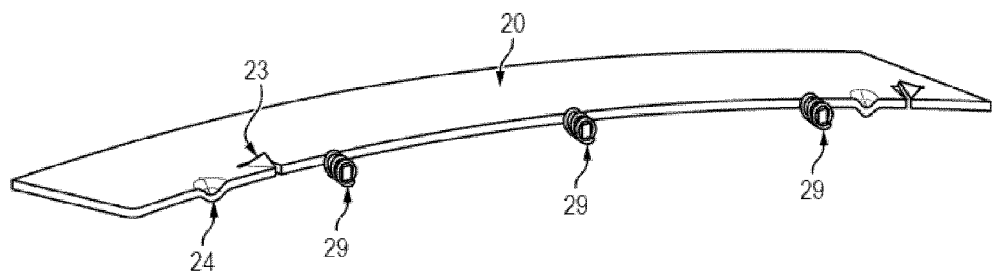
FIGS. 6a and 6b illustrate respectively another variant embodiment of a plate of FIG. 4b, as well as a detail of this variant.
Figure 6B:
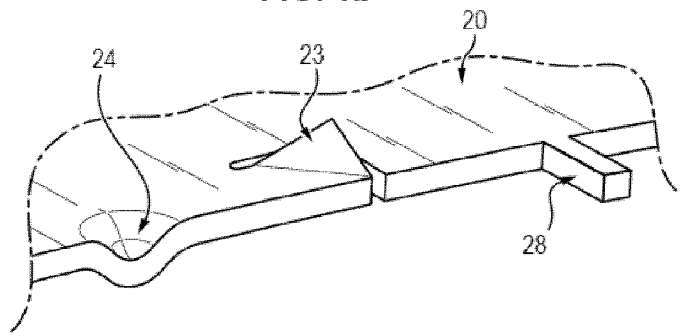

Moreover, as shown in FIGS. 6a and 6b, the plate advantageously comprises a plurality of bosses 24 preferably distributed regularly along the circumference of the plate 20. The bosses 24 are preferably found on the radially inner surface of the plate. They make it possible, by increasing the thickness of the plate, to hold it in a radial position about the axis of the vane assembly and of the platforms, in the groove.

Advantageously, a plurality of recesses, or preferably one circumferential recess, is situated in the blade support groove 1213, and configured to be able to receive the lugs, and to form in the support ring 121 an edge 1214 designed to retain the lugs. Thus, once the plate 20 is inserted into the groove 1213, the lugs allow it to be held in axial position.

The sealing plate 20 can further include a circumferential groove 21, as in FIG. 2c or the variants described earlier for the other embodiments, so as to guarantee its "fuse" function.

For this embodiment, the fuse function of the plate can also be implemented in other ways.

Figure 5A:
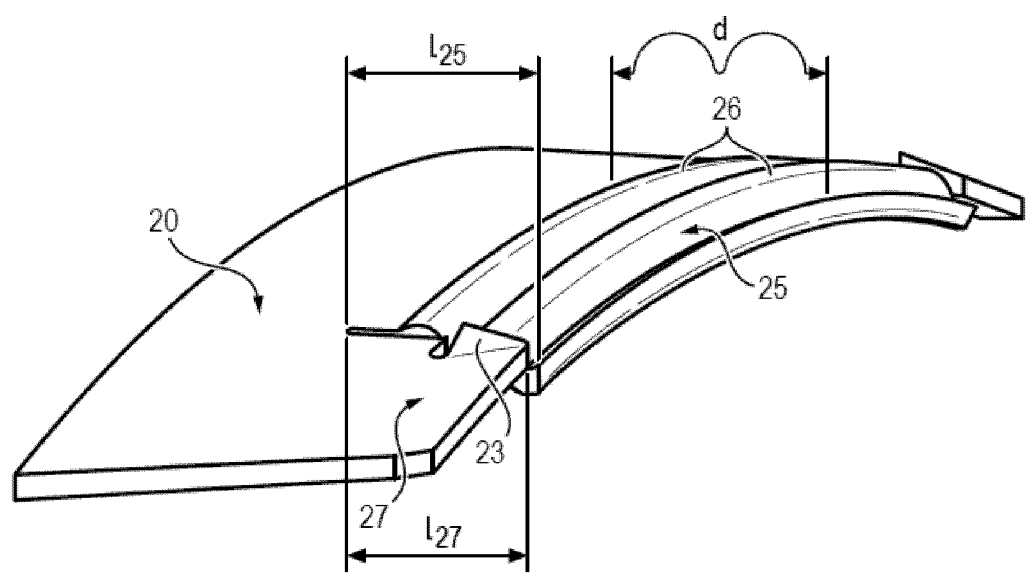
FIGS. 5a and 5b illustrate respectively another variant embodiment of a plate of FIG. 4b, as well as a detail of this variant.
Figure 5B:
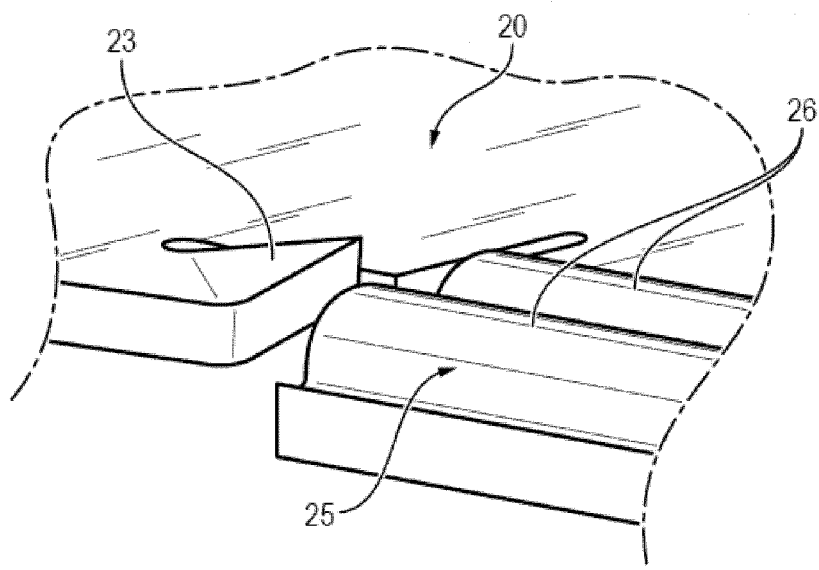

According to a first variant shown in FIGS. 5a and 5b, the sealing plate 20 includes a plurality of portions 25 shaped like sectors of a ring, at which the sheet metal is corrugated in a direction transverse to the plate, that is, once inserted in the support ring 121 of the blades, in a direction substantially parallel to the axis of the vane assembly and of the platforms.

The "direction" of the corrugations is the axis on either side whereof the plate is corrugated. The corrugations thus form parallel furrows 26 shaped as sectors of a ring.

These corrugations make it possible to ensure that the breakage hierarchy is respected in the event of an overspeed, and therefore of a contact between the moving vane assembly of the rotor, located upstream, and the vane assembly 10. Indeed, in the event of a possible contact, the axial forces exerted by the rotor vane assembly on the vane assembly 10 have the effect of causing the plate 20 to buckle by compressing the corrugations in the manner of a spring, which ensures that the sheet metal is moved downstream with respect to the airflow and does not interfere with the breakage hierarchy provided for.

In this regard, the portions 27 of the plate 20 between the two corrugated portions 25 do not have corrugations, that is they are rectilinear in the axial direction defined earlier, and they preferably have a smaller width $I_{27}$ than the width $I_{25}$ of the corrugated portions, the width being measured in the axial direction.

By convention, the "curvilinear distance" d, shown by an undulated arrow, is called the width of the corrugated portion of the plate running along the corrugations, corresponding to the width of the strip obtained by unfolding this corrugated portion, and by opposition the "width" of an undulated portion is the width of the strip occupied by the undulated portion once the sheet metal is folded to form the corrugations.

Preferably, the width of the corrugated portions 25 is equal to the depth I of the groove, so that the curvilinear distance is strictly greater than I, and the rectilinear portions 27 have a width strictly smaller than I.

As can be seen in FIG. 5a, the lugs between which is placed each corrugated portion are made in the adjoining rectilinear portions 27; they are therefore symmetrical with one another with respect to the corrugated portion 25.

In the event of an overspeed of the turbomachine, the corrugated portions 25 can come into abutment against the bottom of the groove in the support ring 121 and the corrugations can compress before the rectilinear portions are loaded, and thus they do not prevent that compression.

Figure 6C:
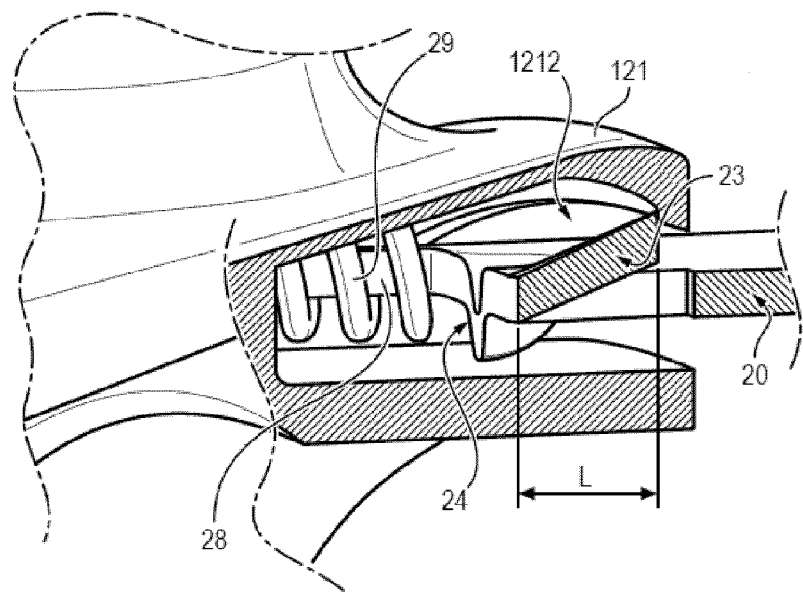
FIG. 6c shows in section the positioning of a sealing plate of FIGS. 6a and 6b in a support ring of a vane assembly.

According to another variant, shown in FIGS. 6a, 6b and 6c, the sealing plate 20 includes, at its end inserted into the groove, a plurality of tabs 28 protruding from said plate in the axial direction. The tabs 28 are preferably regularly distributed over the circumference of the plate 20.

In addition a spring 29 is mounted on each tab 28, the spring being called a shape-memory spring, meaning that when the spring is compressed it does not return to its original position.

As shown in FIG. 6c, in this embodiment the depth I of the groove 1213 is occupied, over a width L, by the lugs 23, and over the rest by the tabs 28 provided with springs 29. In this case the lugs 23 thus do not occupy the entire depth of the groove.

The tabs added to the definition of the sealing plate 20, and on which are positioned the springs, again make it possible to ensure that the breakage hierarchy is satisfied in the event of an overspeed. Indeed, in the event of a possible contact between the rotor vane assembly located upstream and the vane assembly 10, the axial forces exerted by the rotor vane assembly on the plate will have the effect of compressing the shape-memory springs.

Then the fact that the springs have shape memory ensures that they will not exert any forces on the plate 20 after their compression, and thus guaranteeing that the latter do not interfere in the breakage hierarchy provided for in the turbine.

Figure 7A:
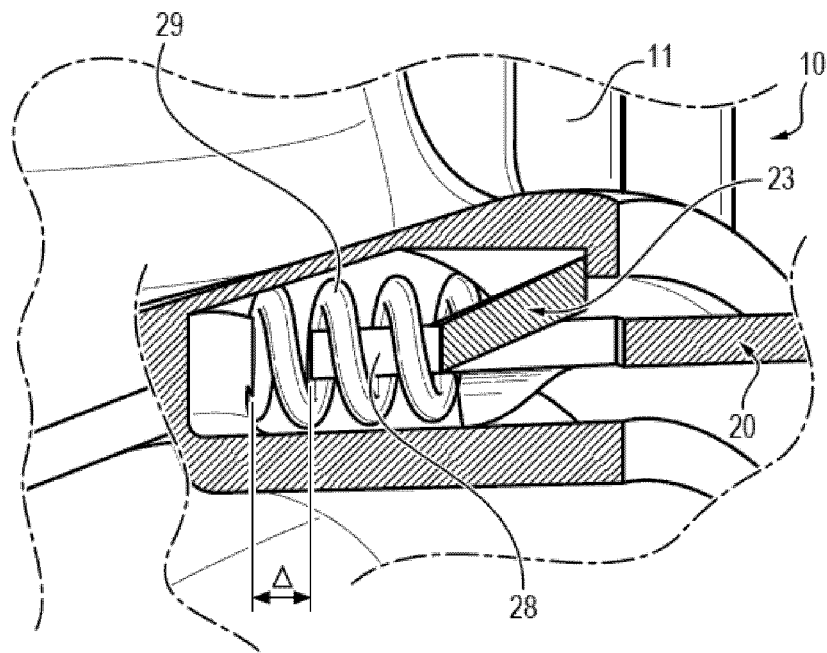
FIG. 7a shows a section view of a variant embodiment of a sealing plate of FIG. 6c once placed in a support ring of a vane assembly.
Figure 7B:
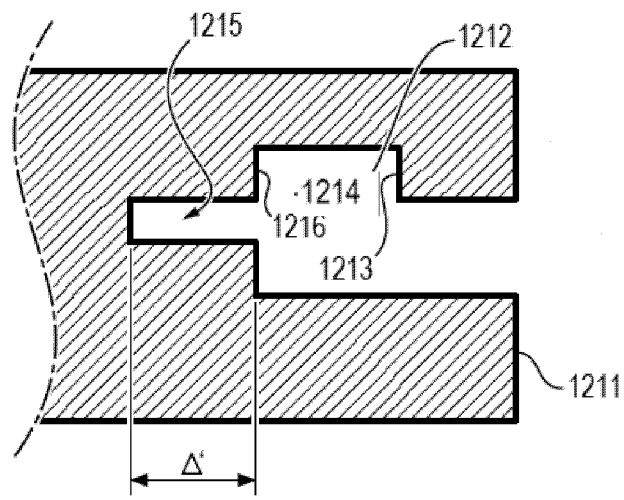
FIG. 7b shows schematically a section view of a variant embodiment of a groove in a support ring of a vane assembly.

In order for the compression of the springs to take place without being hindered by the tabs 28, two possible embodiments are provided for, illustrated in FIGS. 7a and 7b.

According to a first embodiment, shown in FIG. 7a, the springs 29 are longer than the tabs 28 on which they are positioned. Thus during assembly the springs are pressing against the bottom of the groove 1213 of the support ring of the blades and, in the event of contact between the rotor vane assembly located upstream of the vane assembly 10, the springs 29 can be compressed until the tabs come into abutment with the bottom of the groove.

The difference in length Δ between the springs and the tabs must therefore be greater than the difference between the two following clearances: the clearance between the downstream spoiler of the rotor blade located upstream of the vane assembly and the sealing ring 20, and the clearance situated between the parts of the rotor blade and the vane assembly 10 coming into contact first in the event of a displacement of the rotor blade.

As a variant shown in FIG. 7b, the groove 1213 also includes a recess 1215. The height, in a radial direction, of the recess is less than that of the groove, and it corresponds to the height of the tabs 28 so that the recess can receive the tabs.

On either side of the recess 1215 is defined a support surface on which the springs 29 rest. The recess 1215 is advantageously circumferential to facilitate its manufacture.

Advantageously, in this embodiment, the length of the springs is equal to that of the groove, but it may as well be longer or shorter.

In this case, in the event of contact between the rotor vane assembly located upstream of the vane assembly 10, the plate bears against the support surface 1216, which brings about compression of the springs 29 and penetration of the tabs into the recess. The tabs do not hinder displacement of the plate.

As before the depth Δ' of the recess must be greater than the difference between the two following clearances: the clearance between the downstream spoiler of the rotor located upstream of the vane assembly and the sealing plate 20, and the clearance between the parts of the rotor blade and the vane assembly 10 coming into contact first in the event of displacement of the rotor blade.

In addition, in the two variant embodiments, the springs 29 can also have a length and a helical pitch sufficiently high that they can be compressed by the difference between the two mentioned above.

This embodiment also has the advantage that it does not require the implementation of a step consisting of brazing the parts.

Figure 8:
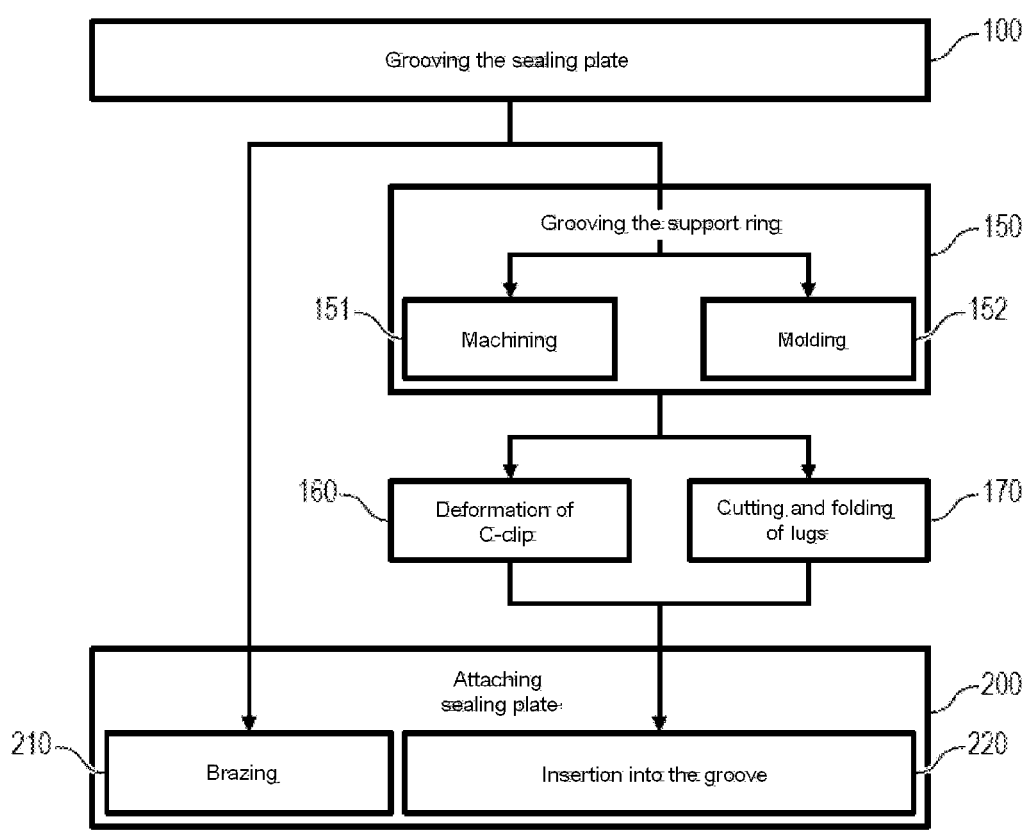
FIG. 8 shows the principal steps of the manufacturing method of a vane assembly according to the embodiments shown in FIGS. 2a to 4e.

Referring to FIG. 8, the manufacturing method for a vane assembly including a sealing plate provided with a groove functioning as a fuse conforming to the preceding description is now summarized.

The steps illustrated in FIG. 8 are shown in an arbitrary order, which does not restrict the order in which they must be implemented.

The method preferably includes at least two steps which are, on the one hand, forming 100 a groove in a sealing plate 20 to ensure its fuse function, then applying 200 the groove to a support ring 121 of the blades 11 of a vane assembly 10. The groove can be made by stamping or machining, for example by electrical discharge machining.

If the vane assembly conforms to the embodiment of FIGS. 2a to 2c, attachment of the sealing plate is accomplished by brazing 210.

Alternatively, if the vane assembly conforms to the embodiment of FIGS. 3a and 3b, or of FIGS. 4a to 4e, the method also includes a step 150 consisting of making a groove 1212, 1213 in the support ring 121 of the blades or in the radially inner surface 1210 of the ring in the case of FIGS. 3a and 3b, or in the upstream face 1211 as in the case of FIGS. 4a to 4e.

The groove 1212 located in the radially inner surface 1210 of the support ring 121 of the blades can be made by machining 151. Alternatively, the groove 1213 made in the upstream face 1211 and having an edge 1214 as for the embodiment of FIGS. 4a to 4e is made, during casting 152 of the ring 121, by inserting a foundry core 30 into the mold used for this purpose. This manufacture is illustrated in FIG. 9a, which shows the core in place in the ring 121, and 9b, which shows the core.

The core 30 advantageously comprises a ring of material 31 provided on its circumference with a protruding tab 32, said tab being provided at its end with a circumferential bulge 33. In this manner the groove obtained has an undercut recess (thus forming the edge 1214) allowing the lugs 23 to be housed inside the groove, pressing against the edge, thus guaranteeing positioning and maintaining in an axial position during operation, that is in the direction of the axis of the vane assembly and of the platforms.

The step 200 consisting of attaching the sealing plate 20 then includes the insertion 220 of a portion of the plate 20 into the groove.

In the embodiment of FIGS. 3a and 3b, wherein the sealing plate 20 is a C-clip, the insertion step 220 corresponds to the insertion of the circumferential protrusion 22 of the plate into the complementary groove 1212. This step is then preceded by a step 160 consisting of deforming the C-clip to reduce its diameter and allow this insertion.

In the embodiment of FIGS. 4a to 4e, the insertion of the sealing ring 20 corresponds to the insertion of a width I of the plate, corresponding to the depth of the groove, into said groove 1213. The method then includes a preliminary step 170 of making lugs by cutting, using a laser for example, then folding. The plate is inserted into the groove until the lugs are positioned in the cavities, against the edge 1214 of the support ring 121 of the blades.

In any case, the method is implemented rapidly because in particular it does not include a step consisting in forming the sealing plate 20 to form corrugations in said plate.

Alternatively, referring to FIG. 10, a manufacturing method for a vane assembly within the embodiments described previously with respect to FIGS. 5a to 5b is described.

During a first step 100', an annular groove 1212 is made in a support ring 121 of blades, during a step consisting of molding the ring, by inserting a foundry core 30 as described earlier.

The recess 1215 at the bottom of the groove, in the case of an embodiment of FIG. 7b, can also be made during molding, or alternatively by machining.

A second step 200' includes the forming of an annular sealing plate by stamping and shaping 210'.

The lugs 23 of the plate 20 are then formed by cutting and folding 220'.

Advantageously, this step consisting of cutting also includes the formation of the tabs 28 at the end of the plate, for the embodiment shown in FIGS. 6a to 6c. Then, for the embodiment shown in FIG. 4, a circumferential groove 21 is made, 230', in the plate 20 by machining. The manufacture of this embodiment was described earlier with reference to FIG. 8, in which it was stated that the order of the steps was not restrictive. Thus it is shown in FIG. 8 that the grooving of the plate 20 is the first step, while in FIG. 10 the first step is the formation of a grooved ring. The skilled person will understand, however, that these two methods are equivalent.

Then, in the case of the embodiment of the plate shown in FIGS. 5a and 5b, portions of the plate between two lugs are folded by shaping 240' to obtain corrugations. In the case of the embodiment shown in FIGS. 6a to 6c, a shape memory spring 29 is positioned, 250', on each tab 28.

Finally, the plate 20 is inserted into the groove 1212 during a placement step 300', on the side of the lugs, and if necessary corrugated portions or tabs equipped with springs.

No matter what variant is adopted, the method makes it possible not to resort to a brazing step and a step consisting of preparing surfaces to be brazed.

The invention claimed is:

1. A fixed vane assembly for distributing flow in a turbomachine, including two coaxial annular platforms, respectively an inner and an outer annular platform, interconnected by a plurality of radial blades, wherein the inner annular platform includes a radial annular wall and a support ring of the blades extending on either side of a radially outer end of said radial annular wall, the fixed vane assembly further including an annular sealing plate fastened to the inner annular platform, on the upstream side of the radial wall with respect to an air flow in the fixed vane assembly,
   wherein the annular sealing plate is fastened to the support ring of the blades and not to said radial annular wall, and
   wherein the annular sealing plate comprises a circumferential groove.

2. The fixed vane assembly according to claim 1, wherein the annular sealing plate is made of sheet metal.

3. The fixed vane assembly according to claim 1, wherein the annular sealing plate is fastened to a radially inner surface of the support ring of the blades.

4. The fixed vane assembly according to claim 1, wherein the support ring of the blades includes, on a radially inner surface, an annular recess, and the annular sealing plate is an elastic split ring including a circumferential protrusion complementary to the recess.

5. The fixed vane assembly according to claim 1, wherein the support ring of the blades includes an upstream face, and the annular sealing plate is fastened to the upstream face of the support ring.

6. The fixed vane assembly according to claim 5, wherein the upstream face of the support ring of the blades includes an annular groove and the annular sealing plate is inserted into said groove over a strip with a width corresponding to the depth of the groove, the annular sealing plate including in said width a plurality of lugs regularly distributed along the circumference of the annular sealing plate to maintain the plate in position into the groove.

7. A turbomachine including at least one fixed vane assembly for distributing flow in a turbomachine, including two coaxial annular platforms, respectively an inner and an outer platform, interconnected by a plurality of radial blades, wherein the inner annular platform includes a radial annular wall and a support ring of the blades extending on either side of a radially outer end of said radial annular wall, the fixed vane assembly further including an annular sealing plate fastened to the inner annular platform, on the upstream side of the radial wall with respect to an air flow in the fixed vane assembly,
   wherein the annular sealing plate is fastened to the support ring of the blades and not to said radial annular wall, and
   wherein the annular sealing plate comprises a circumferential groove.

8. A method for manufacturing a fixed vane assembly according to claim 1, including the steps of:
   making an annular groove in an annular sealing plate by stamping or machining, and applying the annular sealing plate to a support ring of the blades of a radially inner platform of the fixed vane assembly for distributing flow.

9. The method for manufacturing a fixed vane assembly according to claim 8, further including, before applying the annular sealing plate on the support ring, the steps of:
making an annular groove in an upstream face of the support ring, and
making a plurality of lugs on the annular sealing plate by laser cutting and folding, the step of applying the annular sealing plate on the support ring comprising the insertion of the annular sealing plate into the groove of the support ring.

10. The method for manufacturing a fixed vane assembly according to claim 9, wherein the annular groove of the support ring is made during a step of molding said support ring of the blades, by inserting a foundry core into a mold used for making said ring.

11. A fixed vane assembly for distributing flow in a turbomachine, including two coaxial annular platforms, respectively an inner and an outer platform, interconnected by a plurality of radial blades, wherein the inner annular platform includes a radial annular wall and a support ring of the blades extending on either side of a radially outer end of said radial annular wall, the fixed vane assembly further including an annular sealing plate fastened to the inner annular platform, on the upstream side of the radial annular wall with respect to an air flow in the fixed vane assembly,
wherein the annular sealing plate is fastened to the support ring of the blades, and wherein the annular sealing plate comprises a circumferential groove,
wherein the support ring of the blades includes an upstream face, and the annular sealing plate is fastened to the upstream face of the support ring, and
wherein the upstream face of the support ring of the blades includes an annular groove and the annular sealing plate is inserted into said groove over a strip with a width corresponding to the depth of the groove, the annular sealing plate including in said width a plurality of lugs regularly distributed along the circumference of the annular sealing plate to maintain the plate in position into the groove.

12. A method for manufacturing a fixed vane assembly for distributing flow in a turbomachine, including two coaxial annular platforms, respectively an inner and an outer platform, interconnected by a plurality of radial blades, wherein the inner annular platform includes a radial annular wall and a support ring of the blades extending on either side of a radially outer end of said radial annular wall, the fixed vane assembly further including an annular sealing plate fastened to the inner annular platform, on the upstream side of the radial annular wall with respect to an air flow in the fixed vane assembly,
wherein the annular sealing plate is fastened to the support ring of the blades, and
wherein the annular sealing plate comprises a circumferential groove, the method comprising:
making an annular groove in an annular sealing plate by stamping or machining, and
applying the annular sealing plate to a support ring of the blades of a radially inner platform of a fixed vane assembly for distributing flow,
the method further comprising, before applying the annular sealing plate on the support ring,
making an annular groove in an upstream face of the support ring, and
making a plurality of lugs on the annular sealing plate by laser cutting and folding,
the step of applying the annular sealing plate on the support ring comprising the insertion of the annular sealing plate into the groove of the support ring.

13. A method for manufacturing a fixed vane assembly for distributing flow in a turbomachine, including two coaxial annular platforms, respectively an inner and an outer platform, interconnected by a plurality of radial blades, wherein the inner annular platform includes a radial annular wall and a support ring of the blades extending on either side of a radially outer end of said radial annular wall, the fixed vane assembly further including an annular sealing plate fastened to the inner annular platform, on the upstream side of the radial annular wall with respect to an air flow in the fixed vane assembly,
wherein the annular sealing plate is fastened to the support ring of the blades, and
wherein the annular sealing plate comprises a circumferential groove, the method comprising:
making an annular groove in an annular sealing plate by stamping or machining, and applying the annular sealing plate to a support ring of the blades of a radially inner platform of a fixed vane assembly for distributing flow,
the method further comprising, before applying the annular sealing plate on the support ring,
making an annular groove in an upstream face of the support ring, and
making a plurality of lugs on the annular sealing plate by laser cutting and folding,
the step of applying the annular sealing plate on the support ring comprising the insertion of the annular sealing plate into the groove of the support ring,
wherein the annular groove of the support ring is made during a step of molding said support ring of the blades, by inserting a foundry core into a mold used for making said support ring.

14. A fixed vane assembly for distributing flow in a turbomachine, including two coaxial annular platforms, respectively an inner and an outer annular platform, interconnected by a plurality of radial blades, wherein the inner annular platform includes a radial annular wall and a support ring of the blades extending on either side of a radially outer end of said radial annular wall, the fixed vane assembly further including an annular sealing plate fastened to the inner annular platform, on the upstream side of said radial annular wall with respect to an air flow in the fixed vane assembly,
wherein the annular sealing plate is fastened to the support ring of the blades at a radially inner surface of the support ring, and
wherein the annular sealing plate comprises a circumferential groove.

* * * * *